United States Patent
Kinoshita (10) Patent No.: US 10,591,062 B2
(45) Date of Patent: Mar. 17, 2020

(54) GASKET AND MANUFACTURING METHOD THEREOF

(71) Applicant: Ishikawa Gasket Co., Ltd., Minato-ku, Tokyo (JP)

(72) Inventor: Yuichi Kinoshita, Utsunomiya (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 54 days.

(21) Appl. No.: 15/955,846

(22) Filed: Apr. 18, 2018

(65) Prior Publication Data
US 2018/0306324 A1    Oct. 25, 2018

(30) Foreign Application Priority Data
Apr. 19, 2017    (JP) .................................. 2017-082494

(51) Int. Cl.
*F16J 15/12* (2006.01)
*F16J 15/10* (2006.01)
*F02F 11/00* (2006.01)

(52) U.S. Cl.
CPC ........... *F16J 15/123* (2013.01); *F16J 15/102* (2013.01); *F16J 15/104* (2013.01); *F16J 15/122* (2013.01); *F16J 15/126* (2013.01); *D03D 2700/0137* (2013.01); *D10B 2505/06* (2013.01); *F02F 11/002* (2013.01)

(58) Field of Classification Search
CPC ........ F16J 15/123; F16J 15/102; F16J 15/104; F16J 15/122; F16J 15/126; F02F 11/002; D03D 2700/0137; D10B 2505/06
See application file for complete search history.

(56) References Cited

U.S. PATENT DOCUMENTS

| 4,961,991 A * | 10/1990 | Howard ................... B32B 5/08 428/114 |
| 5,549,968 A * | 8/1996 | Byers ........................ B32B 5/26 101/376 |
| 6,530,577 B1 * | 3/2003 | Busby ..................... B32B 27/04 277/651 |
| 2003/0234498 A1* | 12/2003 | Busby ..................... B32B 27/04 277/651 |
| 2004/0070156 A1* | 4/2004 | Smith ..................... B32B 27/04 277/651 |

(Continued)

FOREIGN PATENT DOCUMENTS

| JP | H05214355 | * | 8/1993 |
| JP | 2015132378 A | * | 7/2015 |

*Primary Examiner* — Gilbert Y Lee
(74) *Attorney, Agent, or Firm* — Manabu Kanesaka (57) ABSTRACT

An object of the present invention is to provide a gasket capable of maintaining a surface pressure for a long period of time while securing sealing performance and improving durability and a manufacturing method thereof. A gasket includes a first annular portion which is formed by a metal wire woven fabric and has a seal target hole and a main body portion which is formed by a metal wire woven fabric and is in contact with an outer peripheral edge of the first annular portion, in which a metal wire of the metal wire woven fabric and a metal wire of the metal wire woven fabric are entangled so that the first annular portion and the main body portion are joined to each other and a gap between the metal wires forming the first annular portion is sealed by a resin.

6 Claims, 4 Drawing Sheets

(56) References Cited

U.S. PATENT DOCUMENTS

| | | | | |
|---|---|---|---|---|
| 2009/0322040 A1* | 12/2009 | Banba | ............ | B32B 7/12 |
| | | | | 277/654 |
| 2012/0326391 A1* | 12/2012 | Hirose | ............ | F16J 15/022 |
| | | | | 277/312 |
| 2016/0033043 A1* | 2/2016 | Busby | ............ | F16J 15/102 |
| | | | | 244/131 |
| 2016/0131259 A1* | 5/2016 | Boyd | ............ | F16J 15/104 |
| | | | | 244/131 |

* cited by examiner

GASKET AND MANUFACTURING METHOD THEREOF

RELATED APPLICATIONS

The present applications claim priority from Japanese Application No. 2017-082494, filed Apr. 19, 2017, the disclosure of which is hereby incorporated by reference herein in its entirety.

BACKGROUND OF THE INVENTION

Technical Field

The present invention relates to a gasket and a gasket manufacturing method, and more particularly, to a gasket having improved durability and a manufacturing method thereof.

Related Art

As a gasket which requires surface pressure adjustment, such as a gasket sandwiched between a cylinder head and a cylinder block and a gasket sandwiched between flanges of exhaust pipes, a gasket obtained by laminating a plurality of metal plates, has been used (for example, see JP 2016-142242 A). In such a gasket, a bead or fold is formed in the metal plate to adjust a surface pressure.

SUMMARY OF THE INVENTION

However, when the gasket is fastened for a long period of time, the formed bead or fold is stretched due to stress or thermal expansion so that compressive stress decreases. Therefore, a problem arises in that the surface pressure is not easily maintained for a long period of time in the gasket obtained by laminating the plurality of metal plates. This problem is particularly noticeable in a gasket in which a hot exhaust gas flows, such as an EGR gasket and a turbocharger gasket.

The present invention has been made in view of the above-described problems and an object of the present invention is to provide a gasket capable of maintaining a surface pressure for a long period of time while securing sealing performance and improving durability and a gasket manufacturing method.

A gasket of the present invention to solve the problem is formed by a metal wire woven fabric, the gasket including: an annular portion which includes at least one through-hole; and a main body portion which is in contact with an outer peripheral edge of the annular portion, wherein metal wires of the metal wire woven fabric forming the annular portion and the metal wire woven fabric forming the main body portion are entangled so that the annular portion and the main body portion are joined to each other, and a gap between the metal wires forming the annular portion is sealed by a resin.

A gasket manufacturing method of the present invention to solve the problem includes: weaving a cylindrical metal wire woven fabric by a metal wire and a resin fiber or a resin thread and crushing the cylindrical metal wire woven fabric in a cylindrical axis direction to form an annular portion; weaving another cylindrical metal wire woven fabric by a metal wire and crushing the another cylindrical metal wire woven fabric in the radial direction to form a main body portion; forming an arrangement hole at a predetermined position of the obtained main body portion and arranging the annular portion in the arrangement hole; and thermally compressing the main body portion and the annular portion to be integrated.

According to the present invention, the annular portion and the main body portion are formed by the metal wire woven fabric, the metal wires are entangled with each other to be joined together, and a gap between the metal wires of the annular portion is sealed by a resin. Therefore, it is possible to secure the sealing performance around the through-hole while using the compressive stress generated by the metal wire woven fabric as the gasket. Accordingly, since it is advantageous to keep the surface pressure while securing the sealing performance compared to the conventional gasket obtained by laminating the plurality of metal plates, the durability can be improved.

BRIEF DESCRIPTION OF DRAWINGS

FIGS. 2A to 2C illustrate a part of a gasket manufacturing method of FIG. 1, where

FIGS. 3A and 3B illustrate a part of a gasket manufacturing method of FIG. 1, where

DETAILED DESCRIPTION OF THE INVENTION

Hereinafter, embodiments of the present invention will be described with reference to the drawings. In the drawings, x indicates a thickness direction and y and z indicate directions which are orthogonal to the x direction and are orthogonal to each other. Additionally, in FIGS. 1 to 4, dimensions are changed so that the configuration is easily understood and dimensions are not necessarily to scale with those of actually manufactured products.

Figure 1:
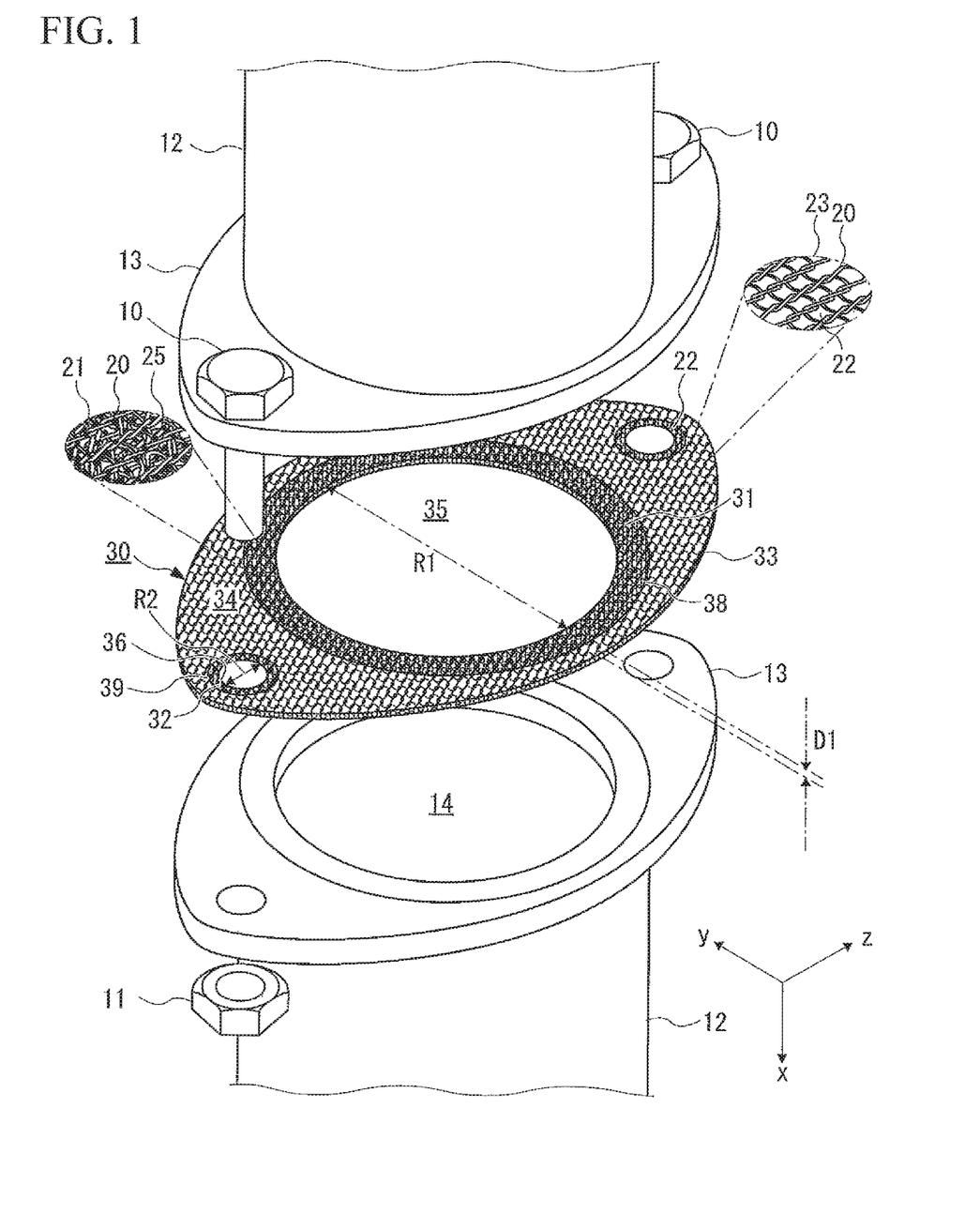
FIG. 1 is a perspective view illustrating a first embodiment of a gasket of the present invention.

As illustrated in FIG. 1, a gasket 30 of a first embodiment is a gasket for a flange to be fastened by bolts 10 and nuts 11 while being sandwiched between flanges 13 of pipes 12.

The gasket 30 is formed by metal wire woven fabrics 21 to 23 obtained by weaving a metal wire 20 and includes a first annular portion 31 which is formed by the metal wire woven fabric 21, a second annular portion 32 which is formed by the metal wire woven fabric 22, and a main body portion 33 which is formed by the metal wire woven fabric 23. The gasket 30 includes a plate surface 34 in which the metal wires 20 of the metal wire woven fabrics 21 to 23 forming each of the first annular portion 31, the second annular portion 32, and the main body portion 33 are entangled with one another to be joined together and which is formed at both ends in the x direction to extend in the plane yz and has a single plate shape of which a plate thickness D1 in the x direction is 0.4 mm to 2.0 mm.

The metal wire 20 is a thin metal thread having a diameter of 0.1 mm to 0.3 mm and a stainless steel wire formed of SUS301, SUS304, and SUS304L or a copper alloy wire for spring formed of brass, phosphor bronze, nickel silver, or beryllium copper alloy are exemplified. The metal wires 20 of the embodiment are formed of the same metal to have the same diameter.

The metal wire woven fabrics 21 to 23 are formed by weaving the metal wires 20 so that stitches (loops) 24 are continuously tied together. Specifically, the metal wire woven fabrics 21 to 23 are woven with weft weaving (flat weaving, rubber weaving, pearl weaving) in which the stitches 24 are drawn out in a direction orthogonal to the extension direction of the woven metal wire 20. The weaving method is not limited as long as the metal wire woven fabrics 21 to 23 are formed by weaving the metal wires 20 and warp weaving (tricot weaving) may be used.

The first annular portion 31 includes a seal target hole 35 which is formed to penetrate in the x direction and is an annular member when viewed from above in the x direction. The second annular portion 32 includes fastening tool insertion holes 36 which are formed to penetrate in the x direction and are an annular members when viewed above in the x direction.

The seal target hole 35 is a through-hole corresponding to a hole 14 through which a fluid of the pipe 12 passes. The fastening tool insertion holes 36 are arranged around the seal target hole 35 and are through-holes through which bolts 10 are inserted. A diameter R1 of the seal target hole 35 is larger than a diameter R2 of the fastening tool insertion hole 36.

In the first annular portion 31, a gap between the metal wires 20 woven into the metal wire woven fabric 21 is sealed by a resin 25. The melting temperature of the resin 25 is lower than the melting temperature of the metal wire 20.

As the resin 25, it is desirable that the melting temperature is relatively high and the restoring force is strong at a temperature higher than the melting temperature (a spring property is high) and a fluororesin such as polytetrafluoroethylene is desirably exemplified. Additionally, in the drawings, the resin 25 is depicted by points, but in fact, the stitch 24 corresponding to a gap between the metal wires 20 is sealed by the resin 25. A state in which the stitch 24 is sealed indicates a state in which a fluid does not pass through the stitch 24 and the first annular portion 31 is formed such that a fluid passing through the seal target hole 35 does not leak to the outside in the circumferential direction of the first annular portion 31 due to the sealing of the stitch 24 by the resin 25.

The main body portion 33 is arranged adjacent to the outer peripheral edge of the first annular portion 31 and the outer peripheral edge of the second annular portion 32, is formed to enclose the first annular portion 31 and the second annular portion 32, and is formed so that its outer peripheral shape is the same as the outer peripheral shape of the flange 13. The main body portion 33 includes one first arrangement hole 38 and two second arrangement holes 39.

The first arrangement hole 38 is formed at the center portion and the outside of the main body portion 33 and the first annular portion 31 is arranged to be in contact with the inner peripheral edge thereof. The second arrangement hole 39 is formed around the first arrangement hole 38 and the second annular portion 32 is arranged to be in contact with the inner peripheral edge thereof.

As illustrated in FIGS. 2A to 3B, in a method of manufacturing the gasket 30, the cylindrical metal wire woven fabric 21 is woven by the metal wire 20 and a resin thread 26, the cylindrical metal wire woven fabric 22 and the metal wire woven fabric 23 are respectively woven by the metal wire 20, and these fabrics are thermally compressed into a plate shape.

The resin thread 26 is a thin thread which is formed of the resin 25 to have a diameter of 0.1 mm to 0.3 mm. The thin thread may be a thread formed by a single or a plurality of fibers. The diameter of the resin thread 26 may be set to be different from the diameter of the metal wire 20.

Figure 2A:
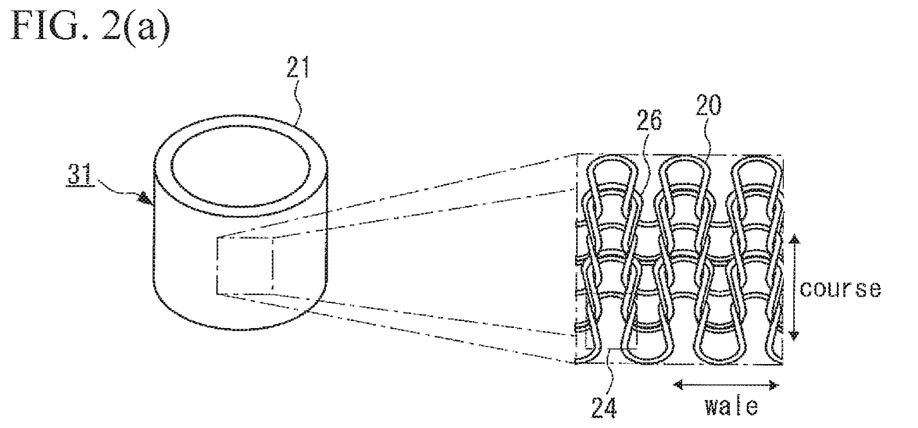
FIGS. 2A to 2C are diagrams illustrating metal wire woven fabrics forming a first annular portion, a second annular portion, and a main body portion, respectively.
Figure 2B:
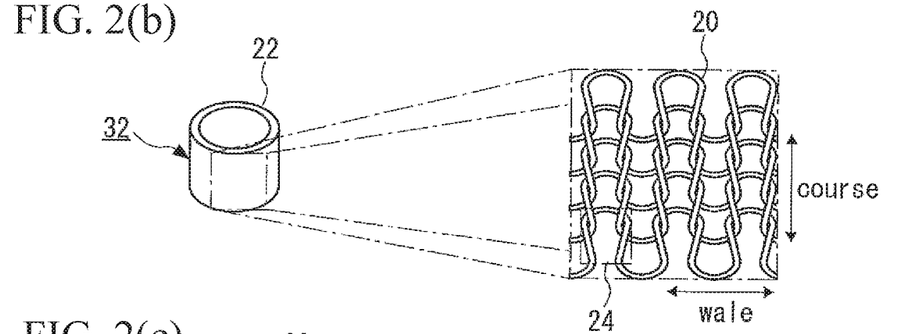
Figure 2C:
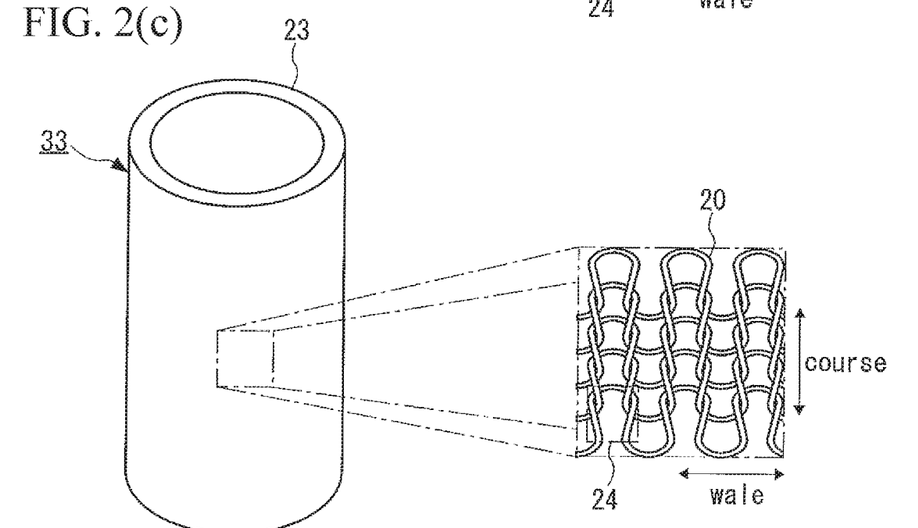

As illustrated in FIGS. 2A to 2C, the cylindrical metal wire woven fabrics 21 to 23 are formed by weaving the metal wire 20 or the metal wire 20 and the resin thread 26 so that the course direction faces the cylindrical axis direction and the wale direction faces the cylindrical circumferential direction. In the example illustrated in the drawings, since the cylindrical metal wire woven fabrics 21 to 23 are woven by one weaving machine, the number of courses and the number of wales are limited to the same number. Additionally, the combination of the metal wire woven fabrics 21 to 23 (the number of courses, the number of wales, and the like) may be changed by changing the pitch of the weaving machine and the first annular portion 31, the second annular portion 32, and the main body portion 33 may be different from one another.

As illustrated in FIG. 2A, unlike the metal wire woven fabrics 22 and 23, the metal wire woven fabric 21 has a structure in which the metal wire 20 is woven and the resin thread 26 is woven together with the metal wire 20 at intervals of "1" course. Additionally, the metal wire woven fabric 21 may have a structure in which the resin thread 26 is woven in all courses. Further, the metal wire woven fabric 21 may have a structure in which the resin thread 26 is intertwined (entangled) with the metal wire 20 or the metal wire 20 is woven first and the resin thread 26 is intertwined with the stitch 24. The weaving method of the metal wire 20 and the resin thread 26 may be different from each other.

Figure 3A:
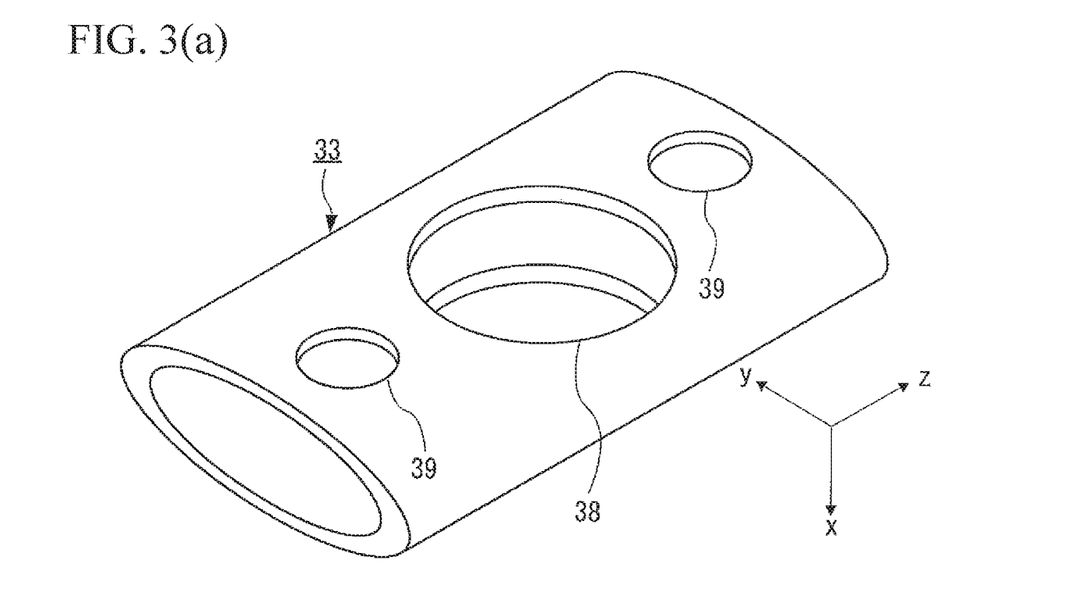
FIG. 3A is a perspective view illustrating the main body portion and FIG. 3B is a perspective view illustrating a state where the first annular portion and the second annular portion are arranged in the main body portion.

As illustrated in FIG. 3A, the main body portion 33 is formed by the metal wire woven fabric 23. Specifically, the metal wire woven fabric 23 in which the cylindrical axis direction faces the z direction orthogonal to the x direction is crushed in the x direction (the cylinder radial direction). Next, the stitch 24 at a predetermined position of the metal wire woven fabric 23 is enlarged in the yz plane to form the first arrangement hole 38 and the second arrangement hole 39. The predetermined position mentioned herein indicates a position corresponding to each of the first annular portion 31 and the second annular portion 32, the first arrangement hole 38 is located at the center portion of the main body portion 33, and the second arrangement holes 39 are located to be diagonal to each other around the first arrangement hole 38. In this way, the metal wire woven fabric 23 which becomes the main body portion 33 is formed when the metal wire woven fabric is crushed in the x direction.

In the embodiment, the main body portion 33 is formed by one cylindrical metal wire woven fabric 23, but the main body portion 33 may be formed by the cylindrical metal wire woven fabrics 23. Further, the sizes or shapes of the first arrangement hole 38 and the second arrangement hole 39 are not limited as long as the metal wire woven fabric 21 of the first annular portion 31 and the metal wire woven fabric 22 of the second annular portion 32 can be respectively arranged therein. The first arrangement hole 38 and the second arrangement hole 39 may be formed by cutting the main body portion 33, but since the main body portion 33 is easily broken when the main body portion is cut out, it is desirable to form the arrangement hole by enlarging the stitch 24.

Figure 3B:
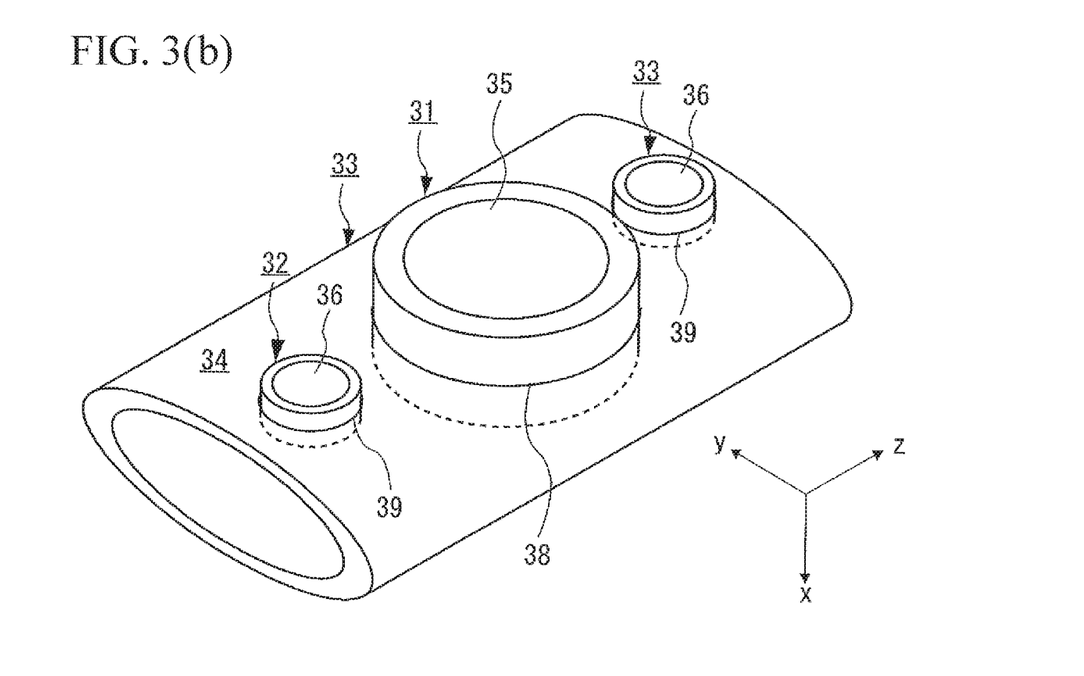

As illustrated in FIG. 3B, the metal wire woven fabric 21 of the first annular portion 31 is arranged inside the first arrangement hole 38, the metal wire woven fabric 22 of the second annular portion 32 is arranged inside the second arrangement hole 39, and the cylindrical axis direction thereof is arranged to face the x direction. At this time, the surface of the metal wire woven fabric 23 of the main body portion 33 is orthogonal to the surfaces of the metal wire woven fabric 21 of the first annular portion 31 and the metal wire woven fabric 22 of the second annular portion 32.

In addition, the first annular portion 31 and the second annular portion 32 may be crushed in the cylindrical axis direction to form a certain shape to some extent before the annular portions are respectively arranged in the first arrangement hole 38 and the second arrangement hole 39 of the main body portion 33.

In this way, all of the combined metal wire woven fabrics 21 to 23 are thermally compressed in the x direction at a temperature higher than the melting temperature of the resin 25 and lower than the melting temperature of the metal wire 20 by a hot pressing machine (not illustrated) to be formed into a single plate shape having the plate surface 34 formed at both ends in the x direction. As a result, this manufacturing method is completed.

When the metal wire 20 is a stainless steel wire and the resin 25 is a fluororesin, a hot compression temperature of the hot pressing machine is exemplified as a temperature higher than about 320° C. to 350° C. corresponding to the fluororesin melting temperature.

In the metal wire woven fabric 21 in which the resin thread 26 is woven together with the metal wire 20 by the hot compression using the hot pressing machine, the resin thread 26 becomes a resin 25 in a molten state or a gel state (rubber-like elastic body) to be filled into a gap between the metal wires 20. Then, when the resin is cooled, a gap between the metal wires 20 is sealed by the resin 25 in the metal wire woven fabric 21 forming the first annular portion 31.

Additionally, the metal wire woven fabric 21 and the metal wire woven fabric 22 are respectively crushed in the cylindrical axis direction to be formed in a certain shape to some extent before the fabrics are respectively arranged in the first arrangement hole 38 and the second arrangement hole 39 of the main body portion 33 and then the fabrics are arranged therein. Further, the metal wire woven fabric 23 is crushed in the radial direction to be formed in a certain shape to some extent in this way.

In this way, since the metal wire woven fabrics 21 to 23 are respectively crushed into a temporary shape before the fabrics are arranged at a predetermined position to be integrated with each other, it is possible to handle a woven fabric which is soft and hard to be determined in shape as a state having a predetermined shape to some extent. Accordingly, since the gasket is easily manufactured, it is advantageous for mass production.

Further, when the metal wires 20 (the stitches 24) are intertwined (entangled) at the boundaries of the first annular portion 31, the second annular portion 32, and the main body portion 33 by the hot compression using the hot pressing machine, these members can be joined together. Specifically, the first annular portion 31 and the main body portion 33 are joined to each other by entangling the stitches 24 at each of the outer peripheral edge of the first annular portion 31 and the inner peripheral edge of the first arrangement hole 38 of the main body portion 33. Further, the second annular portion 32 and the main body portion 33 are joined to each other so that the stitches 24 of the outer peripheral edge of the second annular portion 32 and the inner peripheral edge of the second arrangement hole 39 are entangled with each other.

In this way, the gasket 30 is formed in a plate shape by entangling the metal wires 20 of the first annular portion 31, the second annular portion 32, and the main body portion 33 formed by the metal wire woven fabrics 21 to 23 and a gap between the metal wires 20 of the first annular portion 31 is sealed by the resin 25. Therefore, it is possible to reliably secure the sealing performance around the seal target hole 35 while using a compressive stress generated by the metal wire woven fabrics 21 to 23 as the gasket 30. Accordingly, since it is advantageous to keep a surface pressure while securing sealing performance compared to a conventional gasket obtained by laminating a plurality of metal plates, durability can be improved.

It is desirable that the gasket 30 uses a fluororesin as the resin 25. The fluororesin is a stable material formed by bonding of only fluorine atoms and carbon atoms. Since the bonding force between the atoms is high, the fluororesin is not easily chemically separated and does not bind newly to other materials. Therefore, it is possible to improve the sealing performance of the first annular portion 31 due to heat resistance, flame retardancy, chemical resistance, and non-tackiness of fluororesin.

Further, the fluororesin is more elastic than the metal wire 20 as a mechanical feature. Therefore, even when the metal wire woven fabrics 21 to 23 are compressed in the same direction, the compressive stress of the metal wire woven fabric 21 can be set to be different from those of the metal wire woven fabrics 22 and 23. Accordingly, it is advantageous to set different compressive stresses for the first annular portion 31, the second annular portion 32, and the main body portion 33.

For example, even when powder of carbon or the like is filled into the stitch 24 of the first annular portion 31 and is compressed, a gap between the metal wires 20 can be blocked. However, since the powder is scattered at the time of filling, the powder filling amount becomes sufficient or insufficient or the powder is not filled to the center portion of the first annular portion 31 in the thickness direction. Further, even when there is an attempt to melt and fill the resin 25 into the metal wire woven fabric 21 after weaving the metal wire woven fabric 21, there is a concern that the powder may not be filled to the center portion of the first annular portion 31 in the thickness direction.

Here, according to the manufacturing method of the gasket 30, when the metal wire woven fabric 21 is woven by the resin thread 26 together with the metal wire 20 and the metal wire woven fabric 21 is thermally compressed, the resin 25 can be filled into all gaps formed between the metal wires 20 of the first annular portion 31 formed by the metal wire woven fabric 21. That is, even when the metal wire woven fabric 21 is thick in the cylindrical axis direction or the stitch 24 is thin, the resin 25 can be filled into every corner. Accordingly, since it is possible to simplify a step of filling the resin 25 into the gap between the metal wires 20 of the first annular portion 31, it is possible to reliably seal the gap between the metal wires 20 of the first annular portion 31 while forming the gasket 30.

In addition, a resin fiber may be used instead of the resin thread 26. Further, a plurality of resin threads 26 or resin fibers may be wound and woven to one metal wire 20.

The fluororesin becomes a gel state while not being completely melted even at a temperature higher than the melting temperature. Therefore, even when there is an attempt to fill the resin after weaving the metal wire woven fabric 21, it is not easy to fill the resin into a fine portion like the gap between the metal wires 20 of the metal wire woven fabric 21. For that reason, this manufacturing method is suitable for a case in which the fluororesin is used as the resin 25 and the fluororesin can be easily filled into the gap between the metal wires 20.

Further, since the gasket is formed by the metal wire woven fabrics 21 to 23 obtained by weaving the metal wire 20, it is possible to realize a decrease in weight compared to the conventional gasket obtained by laminating the plurality of metal plates. Accordingly, since it is advantageous for a decrease in weight of an engine, it is possible to improve the fuel efficiency of the engine.

Further, since it is possible to omit a step of forming a bead or fold in each metal plate compared to the conventional gasket obtained by laminating the plurality of metal plates, the gasket can be manufactured simply and productivity can be improved.

The gap between the metal wires 20 of the metal wire woven fabric 22 forming the second annular portion 32 and the metal wire woven fabric 23 forming the main body portion 33 other than the metal wire woven fabric 21 forming the first annular portion 31 may be sealed by the resin 25.

Figure 4:
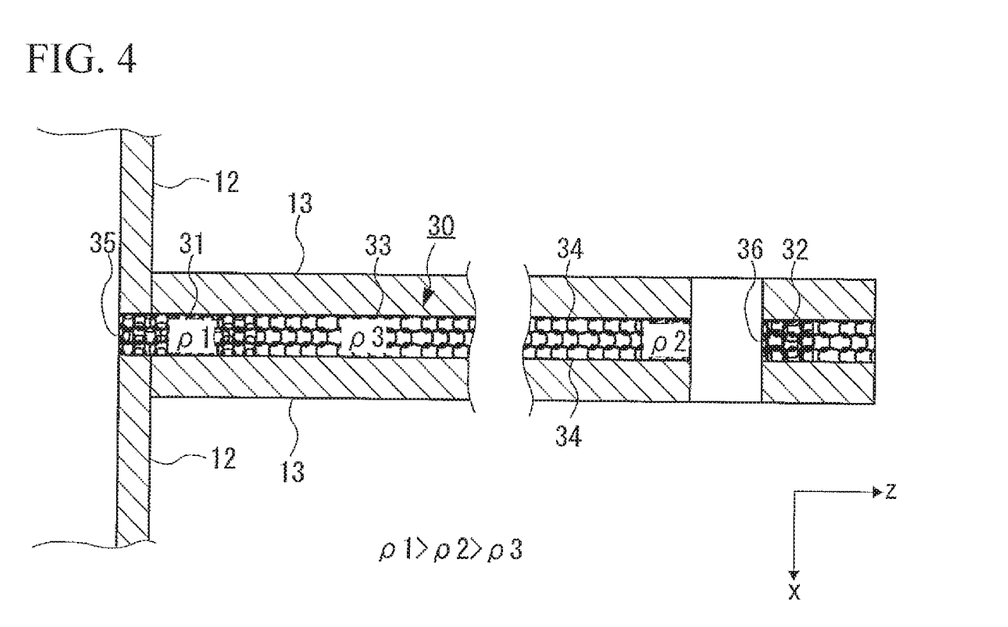
FIG. 4 is a cross-sectional view illustrating a second embodiment of the gasket of the present invention.

As illustrated in FIG. 4, in the gasket 30 of a second embodiment, the first annular portion 31, the second annular portion 32, and the main body portion 33 have different compressive stresses in the x direction while the gasket 30 is sandwiched between the flanges 13 of the pipes 12 and is fastened by the bolts 10 and the nuts 11.

The compressive stresses for the first annular portion 31, the second annular portion 32, and the main body portion 33 are generated when the tightening force (fastening force) generated by the bolts 10 and the nuts 11 becomes equal to or larger than the degree that the plate surface 34 becomes familiar to the seat surface of the flange 13 (the degree that both plate surfaces 34 contact the seat surface of the flange 13 without gaps).

Specifically, in the embodiment, the first annular portion 31, the second annular portion 32, and the main body portion 33 have different volume densities of the metal wires 20 in the metal wire woven fabrics 21 to 23 forming these portions. Additionally, the volume density is the mass per unit area. For example, the volume density of the metal wire 20 in the metal wire woven fabric 21 indicates the mass of the metal wire 20 used for the metal wire woven fabric 21.

The volume density of the metal wire 20 decreases in order of the volume density $\rho1$ of the metal wire 20 of the first annular portion 31, the volume density $\rho2$ of the metal wire 20 of the second annular portion 32, and the volume density $\rho3$ of the metal wire 20 of the main body portion 33, and the volume density $\rho1$ becomes maximal. That is, the metal wire 20 is densified in order of the main body portion 33, the second annular portion 32, and the first annular portion 31, and the first annular portion 31 is most densified. That is, the surface pressure of the gasket 30 increases in order of the main body portion 33, the second annular portion 32, and the first annular portion 31, and the first annular portion 31 has the maximum surface pressure.

The compressive stresses in the x direction of the first annular portion 31, the second annular portion 32, and the main body portion 33 of the gasket 30 when the flange 13 is fastened can be set to be different in accordance with the material, the wire diameter, and the number of the metal wire 20. Further, the compressive stress can be set to be different in accordance with the number of courses and the number of wales of the stitch 24 before the compression of the metal wire woven fabric 21 in the x direction, the size of the stitch 24, the weaving method, and the like. In addition, the compressive stress can be set to be different in accordance with the direction or the number of lamination of the metal wire woven fabric 21. Additionally, there is a case in which the compressive stress in the x direction decreases even when the volume density of the metal wire 20 is large in accordance with the material of the metal wire 20 or the weaving method of the metal wire woven fabrics 21 to 23.

Here, in the gasket 30, the size of each of the stitches 24 of the metal wire woven fabrics 21 to 23, the wire diameter of the metal wire 20, the weaving method, the number of the metal wires 20 to be woven at one time, and the material forming the metal wire 20 may be set to be different.

In this way, it is desirable that the first annular portion 31, the second annular portion 32, and the main body portion 33 of the gasket 30 have different compressive stresses. When the compressive stresses are set to be different, it is possible to freely adjust the surface pressure of each of the first annular portion 31, the second annular portion 32, and the main body portion 33 when the flange 13 is fastened. Accordingly, since it is advantageous to keep a surface pressure even when the gasket is fastened for a long period of time compared to the conventional gasket obtained by laminating the plurality of metal plates, the durability can be improved.

The gasket 30 can be formed into an arbitrary shape by using the easy processability and flexibility of the metal wire woven fabrics 21 to 23 and can change the compressive stress at an arbitrary portion in the x direction. Accordingly, the gasket can be applied to various applications.

The gasket 30 is not limited to the flange gasket and can be also applied to, for example, a gasket for an exhaust gas manifold or a gasket for a cylinder head. Then, the gasket can be also applied to a gasket having many seal target holes 35. Additionally, in the gasket for the cylinder head, an annular portion corresponding to a water hole or an oil hole may be manufactured other than the cylinder bore.

The volume density of the metal wire 20 of the gasket 30 may increase in order of the volume density $\rho1$, the volume density $\rho2$, and the volume density $\rho3$. The repulsive force in the x direction of the first annular portion 31, the second annular portion 32, and the main body portion 33 can be changed variously in response to the shape of the gasket and the application thereof.

REFERENCE SIGNS LIST 20 metal wire
21 to 23 metal wire woven fabric
25 resin
26 resin wire
30 gasket
31 first annular portion
32 second annular portion
33 main body portion
34 plate surface
35 seal target hole
36 fastening tool insertion hole

What is claimed is:

1. A gasket comprising a metal wire woven fabric, and including
   at least an annular portion having a through-hole; and
   a main body portion contacting an outer peripheral edge of the at least one annular portion,
   wherein the at least one annular portion comprises a compressed first tubular metal wire woven fabric, which is woven in an axis direction of the first tubular metal wire woven fabric and compressed in the axis direction, the main body portion comprises a compressed second tubular metal wire woven fabric, which is woven annularly in an axis direction of the second tubular metal wire woven fabric and compressed in a radial direction of the second tubular metal wire woven fabric, and another through-hole where stitches of the compressed second tubular metal wire woven fabric are enlarged, in which the annular portion is disposed, and the metal wires of the metal wire woven fabric forming the at least one annular portion and the metal wire woven fabric forming the main body portion are entangled so that the at least annular portion and the main body portion are joined to each other, and a gap between the metal wires forming the at least one annular portion is sealed by a resin.

2. The gasket according to claim 1, wherein the resin is a fluororesin.

3. The gasket according to claim 1, wherein a compressive stress in a thickness direction of the metal wire woven fabric forming the at least one annular portion is different from a compressive stress in a thickness direction of the metal wire woven fabric forming the main body portion.

4. The gasket according to claim 1, wherein the main body portion includes an upper portion, a lower portion disposed under the upper portion, and two edge portions extending continuously between the upper portion and the lower portion.

5. A gasket manufacturing method comprising:

weaving a tubular metal wire woven fabric in a tubular axis direction by a metal wire and a resin fiber or a resin thread and crushing the tubular metal wire woven fabric in the tubular axis direction to form an annular portion;

weaving another tubular metal wire woven fabric in a tubular axis direction of the another tubular metal wire woven fabric by a metal wire and crushing the another tubular metal wire woven fabric in a radial direction to form a main body portion;

forming an arrangement hole by enlarging stitches in metal wire woven fabric at a predetermined position of the obtained main body portion and arranging the annular portion in the arrangement hole; and thermally compressing the main body portion and the annular portion to be integrated.

6. The metal gasket manufacturing method according to claim 5, wherein the tubular metal wire woven fabric and the another tubular metal wire woven fabric are joined to each other by entangling stitches at an outer peripheral edge of the tubular metal wire woven fabric and an inner peripheral edge of the another tubular metal wire woven fabric.

* * * * *